United States Patent
Lucas

(10) Patent No.: US 10,421,216 B2
(45) Date of Patent: Sep. 24, 2019

(54) METHOD FOR PREPARING A POWDER OF BROWN MACROALGAE BY STIRRING AND A METHOD OF MANUFACTURING RIGID OBJECTS FROM SAID POWDER

(71) Applicant: ALGOPACK, Onnaing (FR)

(72) Inventor: Remy Lucas, Saint Malo (FR)

(73) Assignee: ALGOPACK, Onnaing (FR)

(*) Notice: Subject to any disclaimer, the term of this patent is extended or adjusted under 35 U.S.C. 154(b) by 226 days.

(21) Appl. No.: 15/513,420

(22) PCT Filed: Sep. 15, 2015

(86) PCT No.: PCT/FR2015/052455
§ 371 (c)(1),
(2) Date: Mar. 22, 2017

(87) PCT Pub. No.: WO2016/046469
PCT Pub. Date: Mar. 31, 2016

(65) Prior Publication Data
US 2017/0266847 A1 Sep. 21, 2017

(30) Foreign Application Priority Data
Sep. 23, 2014 (FR) ...................... 14 58981

(51) Int. Cl.
*B29B 9/08* (2006.01)
*B29K 1/00* (2006.01)
*D21B 1/06* (2006.01)
*B29C 43/00* (2006.01)
*B29C 43/52* (2006.01)
*B29K 105/00* (2006.01)

(52) U.S. Cl.
CPC .............. *B29B 9/08* (2013.01); *B29C 43/003* (2013.01); *B29C 43/52* (2013.01); *D21B 1/063* (2013.01); *B29K 2001/00* (2013.01); *B29K 2105/251* (2013.01)

(58) Field of Classification Search
CPC ......... B29B 9/08; B29C 43/52; B29C 43/003; D21B 1/063; B29K 2105/251; B29K 2001/00
See application file for complete search history.

(56) References Cited

U.S. PATENT DOCUMENTS

2010/0272940 A1 10/2010 Shi et al.

FOREIGN PATENT DOCUMENTS

EP 2489631 A1 8/2012
WO WO-2014128411 A1 * 8/2014 ........... B29C 43/003

OTHER PUBLICATIONS

English translation of the International Preliminary Report on Patentability from the International Searching Authority dated Mar. 23, 2017 for corresponding International Application No. PCT/FR2015/052455, filed Sep. 15, 2015.
English translation Written Opinion of the International Searching Authority dated Mar. 23, 2017 for corresponding International Application No. PCT/FR2015/052455, filed Sep. 15, 2015.
French Search and Written Opinion dated Nov. 26, 2014 for corresponding French Application No. 1458981, filed Sep. 15, 2015.
International Search Report dated Jan. 8, 2016 for corresponding International Application No. PCT/FR2015/052455, filed Sep. 15, 2015.
Written Opinion of the International Searching Authority dated Jan. 8, 2016 for corresponding International Application No. PCT/FR2015/052455, filed Sep. 15, 2015.

* cited by examiner

*Primary Examiner* — William P Fletcher, III
(74) *Attorney, Agent, or Firm* — David D. Brush; Westman, Champlin & Koehler, P.A.

(57) ABSTRACT

A method is provided for manufacturing a rigid object from a powder produced from shear stirred brown macroalgae so as to extract proteins, such as actin, from the brown macroalgae, the powder consisting of particles having an equivalent diameter smaller than or equal to 1.5 millimeters and having a residual moisture content smaller than or equal to 45%. The method includes thermo-compression of the powder in a mould, the powder being brought to a temperature between 50 and 100° C. and subjected to a pressure of between 150 and 4000 bars for 50 seconds to 45 minutes. Also provided is a method for preparing the powder.

21 Claims, 2 Drawing Sheets

METHOD FOR PREPARING A POWDER OF BROWN MACROALGAE BY STIRRING AND A METHOD OF MANUFACTURING RIGID OBJECTS FROM SAID POWDER

1. CROSS-REFERENCE TO RELATED APPLICATIONS

This Application is a Section 371 National Stage Application of International Application No. PCT/FR2015/052455, filed Sep. 15, 2015, the content of which is incorporated herein by reference in its entirety, and published as WO 2016/046469 on Mar. 31, 2016, not in English.

2. FIELD OF THE INVENTION

The field of the invention is that of renewable and biodegradable materials.

More specifically, the invention relates to a method for preparing a powder from macroalgae and a method of manufacturing rigid objects from this powder.

The invention finds particular application in the production of manufactured products, such as residential gateway housings, threaded plugs, flower pots or funerary urns.

3. STATE OF THE ART

Brown macroalgae, also called Phaeophyceae, form the most abundant algae class in cold or temperate waters of the world.

However, they remain a widely underexploited plant resource.

It is known to treat brown macroalgae in order to extract alginate, mannitol or certain sulphated fucans contained in their walls, intended for the food industry, the pharmaceutical industry or the cosmetic industry, for example.

Methods are also known for the extraction of active substances acting as a phytosanitary product contained in brown macroalgae, such as laminarins.

It was also thought to produce bioethanol from brown macroalgae by bacterial fermentation of certain sugars present in the wall of these algae.

It has also been proposed, for example in document US2010/0272940, to substitute in plastic manufactures a portion of the synthetic plastic material with material from algae.

This known technique of substituting plastic with algae however emphasises the use of microalgae which are notably richer in cellulose than macroalgae. They also have the disadvantage of allowing only partial replacement of the synthetic plastic material with algal material.

More recently, the applicant of the present patent application proposed in document WO2014/128411 to produce manufactured articles from waste from the alginate or laminarin extraction industry.

The volume of waste produced by alginate and/or laminarin factories remains limited and does not consider very large scale production of rigid objects from brown macroalgae.

4. SUMMARY OF THE INVENTION

An aspect of the present disclosure relates to a method for preparing a brown macroalgae powder intended for the manufacture of rigid manufactured articles.

In the context of the invention, by "rigid object" is meant an object which does not bend and which is resistant to deformation forces and which consequently differs from soft or flexible objects.

According to the invention, the method at least comprises the following steps, carried out in that order:

harvesting said brown macroalgae ;

shear mixing said macroalgae in a tank a rate of at least 4 rpm for 6 to 24 hours, so as to extract proteins, such as actin, from said macroalgae;

drying said stirred and dried macroalgae at a temperature ranging between 30° C. and 50° C., preferably between 30 and 45° C., so as to obtain stirred and dried macroalgae having a residual moisture content smaller than or equal to 45%;

grinding said stirred and dried macroalgae, so to get a macroalgae powder whose particles have an equivalent diameter smaller than or equal to 1.5 millimeters.

Thus, in a novel way, the invention proposes to prepare a raw material in powder form essentially from untreated brown macroalgae, taken from the high seas or on the foreshore or else grown on floating ropes, the resource of which is very important.

It should also be noted that the method for preparing a powder according to the invention is particularly simple and economical.

It is also readily understood that the duration and speed of stirring can be adapted to each other so that the distance travelled by the algal material during stirring is sufficient to enable a suitable extraction and in an appropriate amount, of the proteins contained in macroalgae.

Drying the stirred macroalgae can be carried out in an oven, for example a rotary furnace, a dryer or an oven, under atmospheric pressure or under vacuum. Maintaining the temperature of the macroalgae stirred at 30° to 50° C. during the drying step is particularly advantageous because the properties of the macroalgae are not altered. It will be noted that the drying step also enables maturation of the biochemical reactions initiated during the stirring step.

Moreover, drying down the moisture content of macroalgae stirred below 45 enables to keep the powder obtained after stirring for several weeks to several months without disintegrating in the case of moisture ingress.

Preferably, said drying step comprises a step of compacting said macroalgae in the form of a plurality of granules of volume between 0.1 and 1 $cm^3$.

Compacting enables to evacuate a part of the water contained in stirred macroalgae.

According to a particular embodiment of the invention, said compaction step comprises a step of adding to said macroalgae, macroalgae treated with a weak acid, such as acetic acid or citric acid and/or with an acid diluted in water.

In the context of the invention, by "weak acid" is meant in its general sense. It is therefore a partially insoluble acid in water.

The macroalgae treated with a weak acid and/or with an acid diluted in water can advantageously be an industrial waste deriving from the extraction of alginates and/or laminarins.

Advantageously, said step of shear stirring is carried out at least partially under vacuum.

In this way, the migration of proteins and, in the presence of additives, the diffusion of these additives into macroalgae is promoted.

The stirring step may especially comprise vacuum stirring steps alternating with stirring steps at atmospheric pressure.

In a particular embodiment of the invention, said step of shear stirring is carried out throughout its duration under vacuum.

In a particularly advantageous embodiment of the invention, said step of stirring comprises a step of adding to said macroalgae an additive belonging to the group comprising at least:
  water;
  a dye:
  a coloured pigment;
  an odour absorbent, such as activated carbon, zeolite or porous silica particles;
  an odorant, such as vanillin;
  albumin.

It is thus possible to colour the macroalgae in the mass, to suppress or to mask the pregnant iodinated odour of the macroalgae, which can be heady or unpleasant and to increase the cohesion and the rigidity of the powder thanks to albumin, which makes it possible to obtain shore D hardness values between 65 and 73.

In other embodiments of the invention, it may also be provided to blanch the macroalgae by adding, for example, sodium hypochlorite and/or an enzyme during the stirring step and, if appropriate, a surfactant for dispersing the natural colouring elements of macroalgae, or chloroplasts.

Preferably, said dye or coloured pigments, said odour absorbent and albumin are added in respective proportions of 0.05 to 0.1%, 1 to 3.5% and/or 0.2 to 1%.

In a particular embodiment of the invention, said stirring speed is between 4 and 6 revolutions per minute.

Preferably, in said stirring step, at least 2%, preferably at least 5%, actin contained in said macroalgae, are extracted.

Thus, it is possible to form a sufficient amount of gelled actin to allow agglomeration of the macroalgae between them. In practice, it is found that when the amount of actin extracted is sufficient to agglomerate the macroalgae together, they remain bonded to the materials whose surface is hydrophobic in nature.

Advantageously, said macroalgae are chosen from brown algae of the order laminariales or of the order fucales.

It may in some cases be a mixture of laminariales and/or fucales.

Preferably, said macroalgae are selected from the *laminaria digitata*, *ascophyllum nodosum* species and the genus *fucus* species.

In variations of the invention, said macroalgae may be selected among the *laminaria sacchoriza* or *laminaria sacchoriza* or *lessonia* genus species.

According to a particular aspect of the invention, the residual moisture content of the powder is greater than or equal to 7%.

The inventors have in fact found that a residual moisture content of at least 7% imparts fluidity to the constituent material of the powder, which improves its ability to be shaped.

In a particular embodiment of the invention, the residual moisture content of said powder is between 26 and 45%.

In at least one particular embodiment of the invention, the residual moisture content of said powder is between 0.4 and 0.8.

A light material is thus obtained.

The present invention also relates to a method for manufacturing a rigid object from a powder produced from brown macroalgae shear stirred so as to extract proteins, such as actin, from said brown macroalgae, said powder consisting of particles having an equivalent diameter smaller than or equal to 1.5 millimeters and having a residual moisture content smaller than or equal to 45%.

According to the invention, such a method for manufacturing a rigid object from a powder produced from brown macroalgae comprises a step of thermo-compression of said powder in a mould, said powder being brought to a temperature between 50 and 100° C., preferably between 60 and 100° C. and subjected to a pressure of between 150 and 4000 bars for 50 seconds to 45 minutes.

The invention thus proposes, in a smart way, to form rigid objects from compacted algae powder, which is particularly simple and effective. In particular, thanks to the moisture present in the powder, the powder particles can be fluidly and homogeneously agglomerated and bond firmly together.

It should be noted that the temperature, the pressure and the duration of application of the latter can be optimised as a function of the thickness and the size of the manufactured object.

In at least one advantageous embodiment of the invention, the manufacturing method described above comprises a step of applying at least partially a repellent varnish to the surface of the thermo-compressed powder.

The body of the object is thus protected against the ingress of moisture.

5. LIST OF FIGURES

Other features and advantages of the invention will become more evident on reading the following description of one particular embodiment of the invention, given by way of illustrative and non-limiting example only, and with the appended drawings among which:

6. DESCRIPTION OF A DETAILED EXAMPLE OF THE INVENTION

Figure 1:
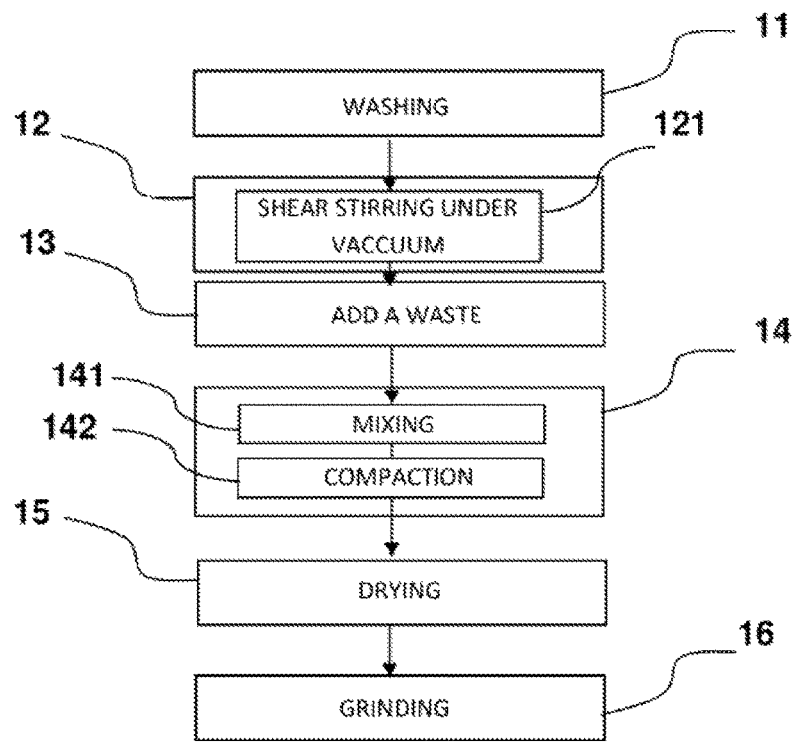
FIG. 1 is a schematic diagrammatic representation of the steps of an exemplary method for preparing a powder from brown macroalgae according to the invention.

FIG. 1 shows in the form a block-diagram the steps of an example of embodiment of a method for preparing a powder intended for the manufacture of rigid manufactured articles according to the invention, from a mixture of *laminaria digitata* and *ascophyllum nodosum*, also known as black seaweed.

In other embodiments of the invention, it may be envisaged to prepare a powder only from *laminaria digitata* or *ascophyllum nodosum* or any other kind of brown algae alone or mixed.

After harvesting *laminaria digitata* and *ascophyllum nodosum* on the high seas, the latter are methoded on a production line of a powder preparation plant where they are washed in a first steps to remove sand and the shells interlaced in the algal thalli (step 11).

About 70% in weight of *laminaria digitata* and 30% in weight of *ascophyllum nodosum* are then poured into a mixing tank, in which they are shear stirred under continuous vacuum for 14 hours at a rate of 6 rpm (step 12). During this stirring step 12, 0.03% w/w of a natural dye is added gradually during a step 121 and 1.2% w/w of activated carbon fines is added to mask the odour emanating from them.

At the end of step 12, a block of macroalgae is obtained, the appearance of which reveals that they are agglomerated with one another by an actin gel.

To the macroalgae extracted from the mixing tank is then added 8% in mass of a waste obtained from an alginate production plant, consisting of a residue of low-acid-treated brown macroalgae from which alginates are extracted (step 13).

In a step 14, the macroalgae extracted from the mixing tank and the macroalgae treated with the weak acid are mixed by means of an auger (step 141) and this mixture is compacted in an annular matrix granulate press, in the form of substantially cylindrical granules of about 6 millimeters and 10 to 20 millimeters in height (step 142).

In a variant of this particular embodiment of the invention, the macroalgae extracted from the mixing tank can be directly compacted in the form of granules, without adding macroalgae treated with the weak acid.

The granules thus obtained are then dried in an induction heating tunnel or by heat transfer fluid for 6 hours at a temperature of 46° C. (step 15).

In variants of this particular embodiment of the invention, it may be provided to dry the granules for 1 to 15 hours depending on whether a static or dynamic drying mode is used.

Figure 2:
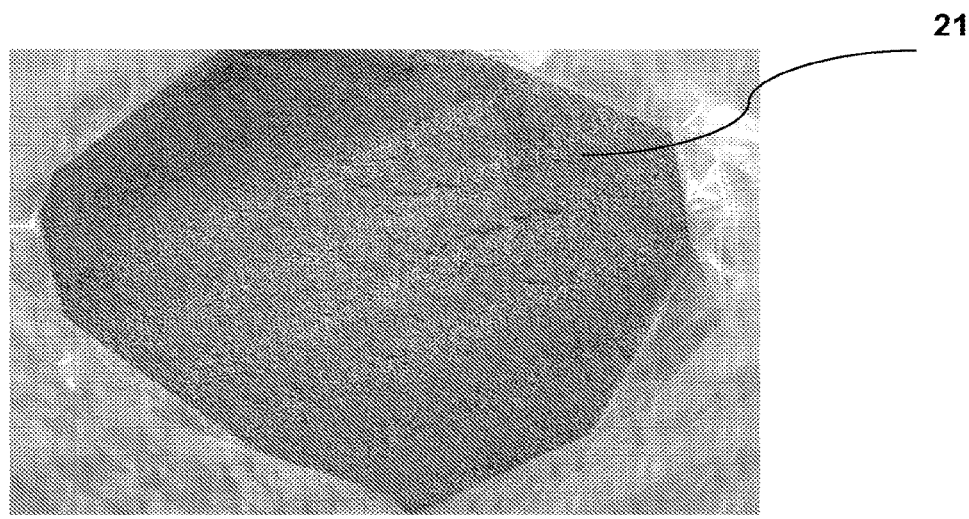
FIG. 2 is a view of a powder obtained by the preparation method shown with reference to FIG. 1.

At the exit of the drying tunnel, the dried granules are conveyed by a belt conveyor to a hammer mill in which the granules are ground in the form of a powder with a grain size of 1 ±0.3 mm (step 16). FIG. 2 is a top view of an open pouch of powder 21 obtained by the preparation method according to the invention.

Each production line of the plant thus enables to continuously prepare approximately 3 tons of powder per hour at an attractive cost.

In a particular embodiment of the invention, the residual moisture content of said powder is about 39%.

The powder thus obtained can be used directly to prepare manufactured articles.

Figure 3:
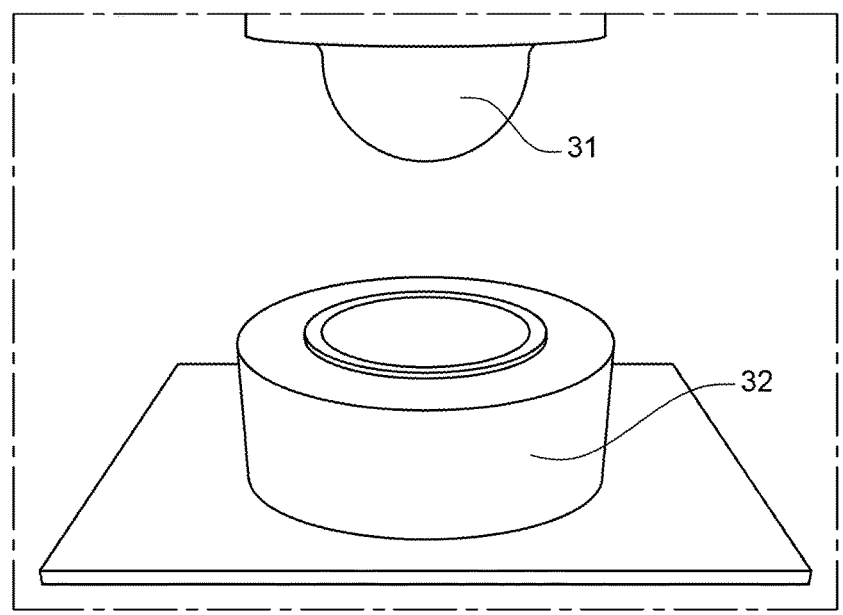
FIG. 3 shows a thermo-compression press used to form a funerary urn from brown macroalgae powder.

Illustrated in FIG. 3 is a thermo-compression press 31 developing a pressure of 300 kg/cm$^2$ for manufacturing the half-shells of a 180 mm-diameter substantially hemispherical funerary urn from a powder of brown macroalgae.

As can be seen in FIG. 3, the press 31 has a piston head equipped with a cast heated to 98° C. by induction. For the sake of mastering the manufacturing method, the temperature of the cast of the piston is regulated.

The powder is dosed automatically by a suction flow in the lower mould 32 brought to a maximum regulated temperature of 98° C.

In this example, 500 g of powder are metered into the mould and a force of 12.5 tons is exerted on the powder with the piston head for a cycle time of 45 minutes, so as to raise the powder temperature to about 70° C.

Figure 4:
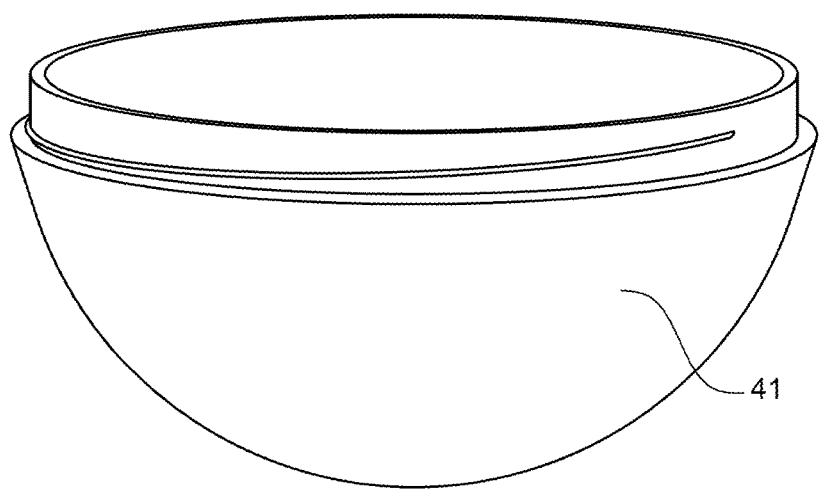
FIG. 4 is a schematic view of a half-shell of a funerary urn manufactured in thermo-compressing a powder of brown macroalgae using the press shown in reference to FIG. 3.

A funeral half-urn 41 is obtained with a mass of about 490 g and a density of 1.58, illustrated schematically in FIG. 4 in a perspective view.

A water repellent lacquer is then sprayed onto the surface of the funeral half-urn to render it insensitive to moisture.

In a subsequent step, the surface of the urn is decorated by pad printing or by digital printing.

It will be noted that, advantageously, when using an imprint tool, the temperature of the casts is chosen between 75 and 110° C.

It can also be envisaged without departing from the scope of the invention, to apply the successive steps for preparing a powder of a mixture of brown and red macroalgae or of a powder of red macroalgae:
  harvesting the macroalgae;
  shear stirring of said macroalgae in a tank a rate of at least 4 rpm for 6 to 24 hours, so as to extract proteins, such as actin, from said macroalgae;
  drying said macroalgae stirred at a temperature ranging between 30° C. and 50° C., preferably between 30 and 45° C., so as to obtain stirred and dried macroalgae having a residual moisture content smaller than or equal to 45%;
  grinding said stirred and dried macroalgae, so to get a macroalgae powder whose particles have an equivalent diameter smaller than or equal to 1.5 millimeters.

An exemplary embodiment remedies the shortcomings of the state of the art mentioned above.

More precisely, An exemplary embodiment provides a raw material totally or at least predominantly produced from brown macroalgae which can be used to manufacture rigid manufactured articles.

A particular embodiment provides this raw material in the form of a powder of constant quality and homogeneous properties.

An exemplary embodiment provides a technique for producing manufactured articles from brown macroalgae which is simple to implement and reliable.

An exemplary embodiment provides such a manufacturing technique whose operating cost is reduced.

An exemplary embodiment also upgrades an algal raw material taken from the open sea or cultivated on floating ropes.

Although the present disclosure has been described with reference to one or more examples, workers skilled in the art will recognize that changes may be made in form and detail without departing from the scope of the disclosure and/or the appended claims.

The invention claimed is:

1. A method for preparing a powder of brown and/or red macroalgae, for the manufacture of rigid objects, wherein the method comprises the following steps in that order:
  harvesting said brown and/or red macroalgae;
  shear stirring said macroalgae in a tank a rate of at least 4 rpm, so as to extract proteins from said macroalgae, wherein said shear stirring is carried out at least partially under vacuum;
  drying said stirred macroalgae, so as to obtain stirred and dried macroalgae having a residual moisture content smaller than or equal to 45%; and
  grinding said stirred and dried macroalgae, so as to obtain a powder of macroalgae.

2. The method for preparing a powder of brown and/or red macroalgae according to claim 1, wherein, during said drying step, the drying temperature of said stirred macroalgae ranges between 30 and 50° C.

3. The method for preparing a powder of brown and/or red macroalgae according to claim 2, wherein, during said drying step, the drying temperature of said stirred macroalgae ranges between 30 and 45° C.

4. The method for preparing a powder of brown and/or red macroalgae according to claim 1, wherein the step of shear stirring of said macroalgae is performed for a time that ranges between 6 and 24 hours.

5. The method for preparing a powder of brown and/or red macroalgae according to claim 1, wherein particles of said powder of macroalgae have an equivalent diameter smaller than or equal to 1.5 millimeters.

6. The method for preparing a powder of brown and/or red macroalgae according to claim 1, wherein said drying step comprises a step of compacting said macroalgae in the form of a plurality of granules of volume between 0.1 and 1 cm$^3$.

7. The method for preparing a powder of brown and/or red macroalgae according to claim 6, wherein said compaction step comprises a step of adding to said macroalgae, macroalgae treated with a weak acid.

8. The method for preparing a powder of brown and/or red macroalgae according to claim 7, wherein the weak acid comprises at least one of acetic acid, citric acid, or an acid diluted in water.

9. The method for preparing a powder of brown and/or red macroalgae according to claim 1, wherein said step of shear stirring is carried out under vacuum throughout its duration.

10. The method for preparing a powder of brown and/or red macroalgae according to claim 1, wherein said step of stirring comprises a step of adding to said macroalgae an additive belonging to the group consisting of:
    water;
    a dye:
    a coloured pigment;
    an odour absorbent;
    an odorant agent;
    albumin.

11. The method for preparing a powder of brown and/or red macroalgae according to claim 10, wherein said dye or said coloured pigments, said odour absorbent and albumin are added in respective proportions of 0.05 to 0.1%, 1 to 3.5% and 0.2 to 1%.

12. The method for preparing a powder of brown and/or red macroalgae according to claim 1, wherein said stirring rate ranges between 4 and 6 rotations per minute.

13. The method for preparing a powder of brown and/or red macroalgae according to claim 1, wherein, in said stirring step, at least 2% actin contained in said macroalgae, is extracted.

14. The method for preparing a powder of brown and/or red macroalgae according to claim 13, wherein in said stirring step, at least 5% actin contained in said macroalgae, is extracted.

15. The method for preparing a powder of brown and/or red macroalgae according to claim 1, wherein said brown macroalgae are chosen from brown algae of the order laminariales or of the order fucales.

16. The method for preparing a powder of brown and/or red macroalgae according to claim 15, wherein said brown macroalgae are selected from the *laminaria digitata, ascophyllum nodosum* species and the genus *fucus* species.

17. The method of preparing a powder of brown and/or red macroalgae according to claim 1, wherein the residual moisture content of said powder is greater than or equal to 7%.

18. A method of manufacturing a rigid object at least partially from brown macroalgae, wherein the method comprises the following steps in that order:
    shear stirring said macroalgae in a tank a rate of at least 4 rpm, so as to extract proteins from said macroalgae, wherein said shear stirring is carried out at least partially under vacuum;
    drying said stirred macroalgae so as to obtain stirred and dried macroalgae having a residual moisture content smaller than or equal to 45%;
    grinding said stirred and dried macroalgae so as to obtain a powder of macroalgae; and
    thermo-compression of said powder in a mould, said powder being brought to a temperature between 50 and 100° C. and subjected to a pressure of between 150 and 4000 bars for 50 seconds to 45 minutes.

19. The method for manufacturing a rigid object according to claim 18, wherein in said thermo-compression, said powder is brought to a temperature between 60° C. and 100° C.

20. The method for manufacturing a rigid object according to claim 18, further comprising at least one partial step of applying a water-repellent lacquer on a surface of the thermo-compressed powder.

21. The method for manufacturing a rigid object according to claim 18, wherein the shear stirring is performed so as to extract actin from said macroalgae.

* * * * *